United States Patent [19]

Dray

[11] Patent Number: 5,470,514
[45] Date of Patent: Nov. 28, 1995

[54] INJECTION MOLDING METHOD FOR A SHOT OF DETERMINED MASS

[76] Inventor: Robert F. Dray, 5204 Quail Creek Dr., McKinney, Tex. 75070

[21] Appl. No.: 114,685

[22] Filed: Aug. 31, 1993

Related U.S. Application Data

[63] Continuation-in-part of Ser. No. 805,019, Dec. 11, 1991, Pat. No. 5,258,158, which is a continuation-in-part of Ser. No. 699,277, May 13, 1991, Pat. No. 5,151,282.

[51] Int. Cl.⁶ .................................................. B29C 45/52
[52] U.S. Cl. ................ 264/40.4; 264/328.1; 264/328.19; 425/146; 425/147; 425/563
[58] Field of Search .................................. 264/40.1, 349, 264/40.4, 40.5, 328.1; 425/145, 207, 146, 208, 147, 149, 166, 562, 563, 328.17, 328.19

[56] References Cited

U.S. PATENT DOCUMENTS

| | | | |
|---|---|---|---|
| 3,001,234 | 9/1961 | Renier | 425/146 |
| 3,209,408 | 10/1965 | Kelly | 425/146 |
| 3,438,393 | 4/1969 | Godley II | 137/533.17 |
| 3,501,810 | 3/1970 | Powell | 425/146 |
| 3,590,439 | 7/1971 | Swanson . | |
| 4,062,479 | 12/1977 | Szabo | 222/495 |
| 4,105,147 | 8/1978 | Stubbe | 222/413 |
| 4,512,733 | 4/1985 | Eichlseder et al. | 425/207 |
| 4,643,665 | 2/1987 | Zeiger | 425/563 |
| 5,044,926 | 9/1991 | Dinerman et al. | 425/562 |
| 5,112,212 | 5/1992 | Akselrud et al. | 425/557 |
| 5,112,213 | 5/1992 | Oas | 425/562 |
| 5,143,733 | 9/1992 | Von Buren et al. | 425/130 |
| 5,151,282 | 9/1992 | Dray | 425/562 |

FOREIGN PATENT DOCUMENTS 866929  5/1961  United Kingdom .

Primary Examiner—Jill L. Heitbrink
Attorney, Agent, or Firm—Harris, Tucker & Hardin

[57] ABSTRACT

A non-return valve (10) primarily for use with an injection molding machine utilizes a frame (12) which surrounds a first bore (34) and a second bore (32). The second bore (32) is accessed by inlets (30). Outlet passages (40) are located downstream of said inlet (30) and connect second bore (32) with an accumulation area (6). A piston (60) is dimensioned to slidably fit within the first bore (34) and extend into the second bore (32). In a downstream position, the piston (60) allows positive flow of material from the inlet (30) to the outlet (40). In an upstream position, the piston (60) positively blocks flow of material from the inlet (30) to the outlet (40). The piston (60) can be forced to its upstream position at the beginning of the injection step or can be preclosed by eliminating rearward movement prior to injection. A method of injection molding involves precisely determining the mass of the shot and by limiting the rearward translation of the screw during recovery and then building the pressure of the accumulated material to a predetermined pressure.

9 Claims, 4 Drawing Sheets

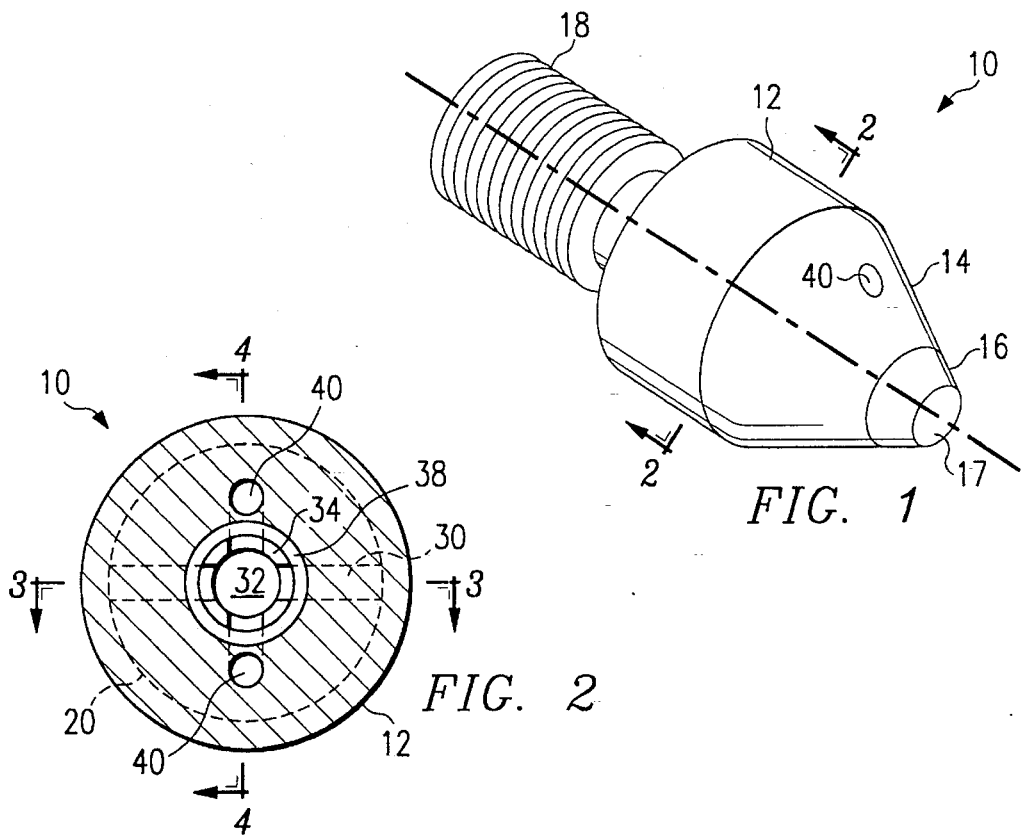
FIG. 1
FIG. 2
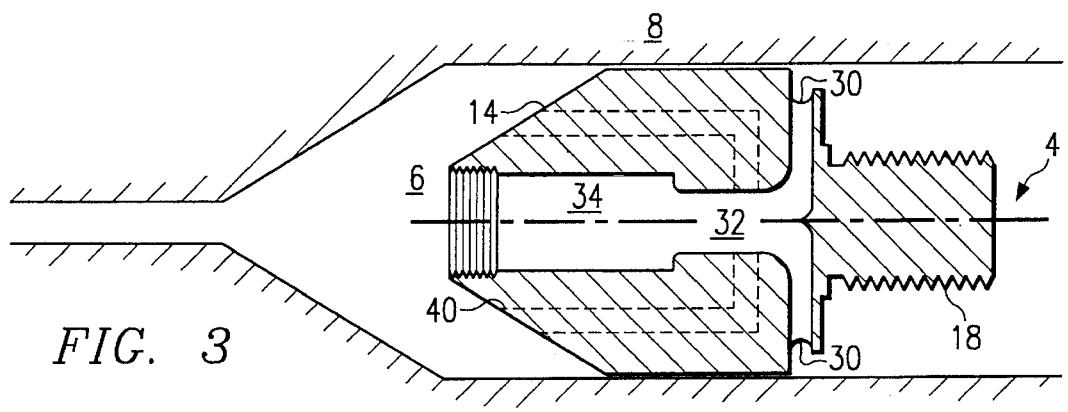
FIG. 3
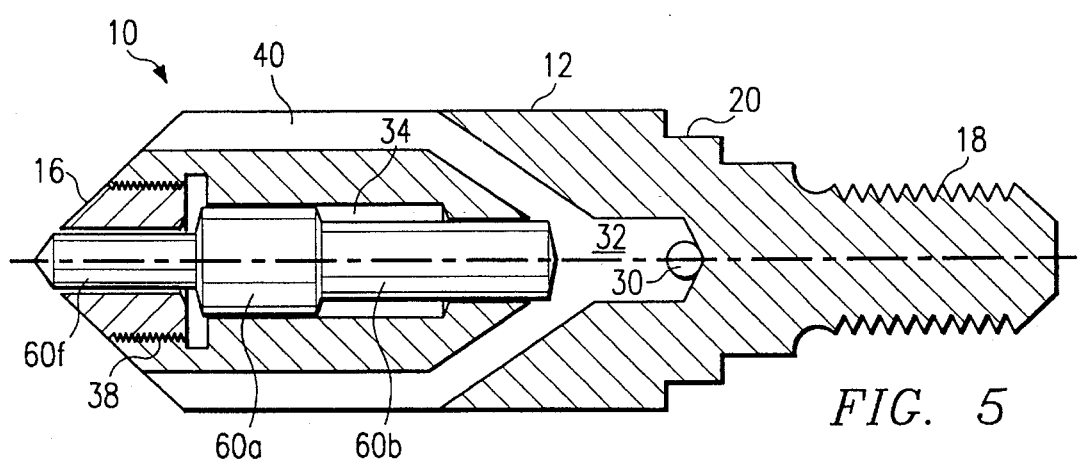
FIG. 5

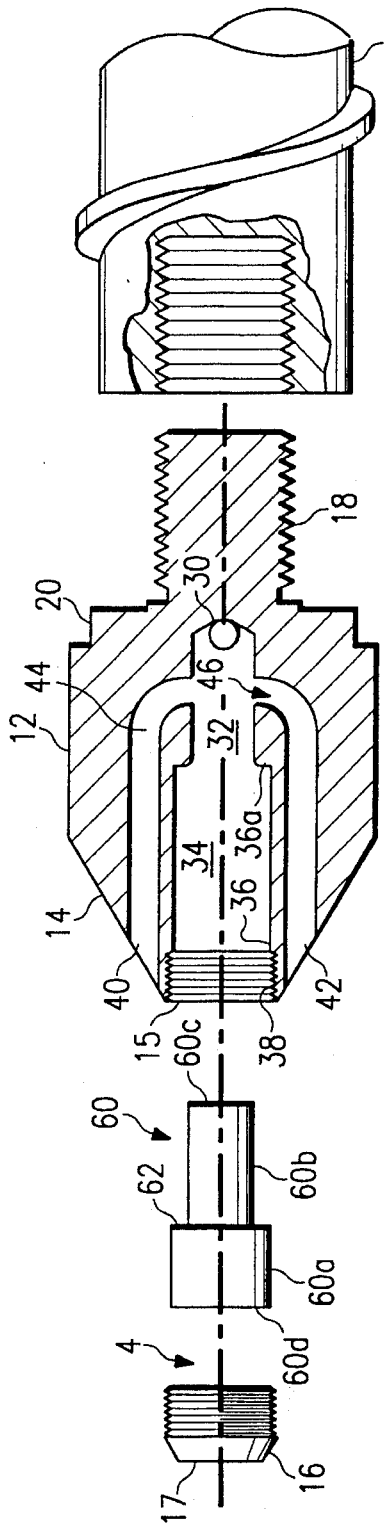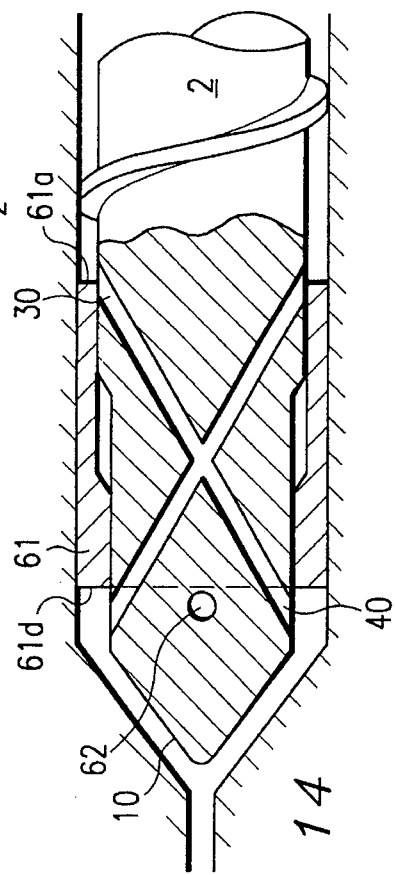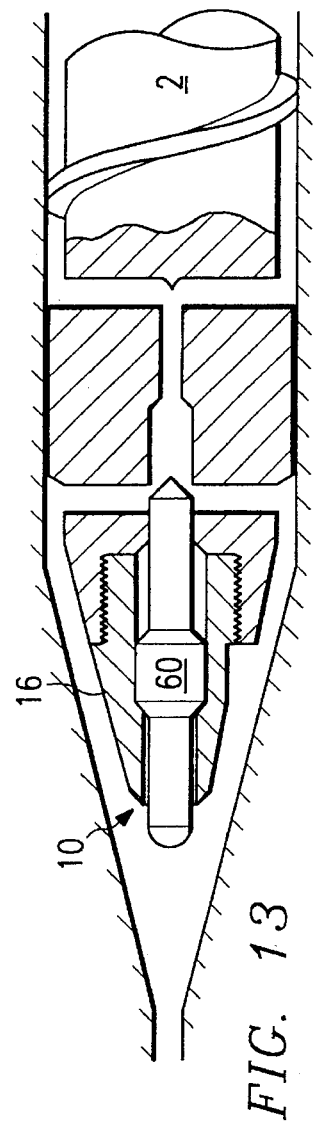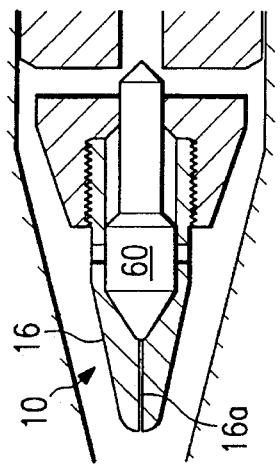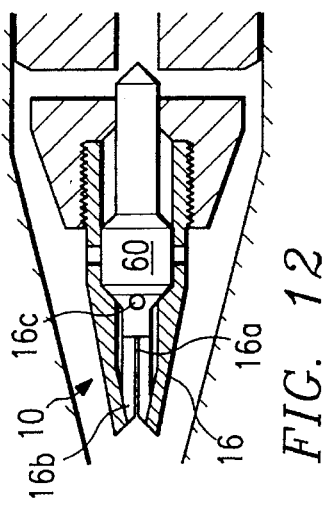
FIG. 4
FIG. 14
FIG. 13
FIG. 11
FIG. 12

INJECTION MOLDING METHOD FOR A SHOT OF DETERMINED MASS

The present application is a continuation-in-part of application Ser. No. 07/805,019, filed Dec. 11, 1991, entitled "Positive Type Non-Return Valve" U.S. Pat. No. 5,258,158 which is a continuation-in-part of application Ser. No. 07/699,277, also entitled "Positive-Type Non-Return Valve," filed on May 13, 1991, which matured into U.S. Pat. No. 5,151,282 on Sep. 29, 1992.

TECHNICAL FIELD OF THE INVENTION

The present invention relates to a non-return valve and a method of injection molding using said non-return valve. In particular, the non-return valve uses a piston to block the material flow path between an inlet and an outlet. The method of using the valve results in the delivery of a uniform mass or shot of plasticized material into a mold.

BACKGROUND OF THE INVENTION

Injection molding is one of the dominant forms of manufacture of plastic articles in the world today. However, a problem with uniformity of product plagues this process of injecting a volume, or shot, of melted plastic into a mold. Uniformity is sacrificed due to the inability to perfectly control the volume of material injected into the mold. This imperfection is due primarily to failure of a non-return valve, found on most injection molding machines, to close in a consistent, repeatable manner and then properly seal against back flow of material during the injection step.

Two primary methods exist for sealing against this back flow of material during the injection step: a ring-type shut off valve or a ball-type check valve. With either method, as the injection ram strokes forward, a ball or piston is forced against a seat or a tapered ring is forced against another ring with a complementary taper. There are various alterations on these devices that either control the length of the stroke or the shape of the valve parts and the plastic flow passages. However, in either case, plastic leakage flow over the ball or piston, or under the ring, creates a pressure drop across this moving member of the valve. This pressure drop becomes the primary force to close the valve. Any variation in the leakage flow before the valve closes results in a variation in the volume of plastic trapped in front of the closed valve. Leakage flow variations occur with these valves resulting in product variations of major or minor significance depending on the product being made operating conditions, and plastic material characteristics.

The sealing surfaces in either a ring-type or ball-type valve can become contaminated with particles which prevent a perfect seal. This allows for material migration back through the valve rather than forward into the mold. Variations in this lost volume of material will cause an imperfect product from the mold which may be unacceptable for its intended use. To detect these unacceptable products requires significant inspection costs or inconvenience for the ultimate user of the product. To improve quality, many manufacturers have implemented statistical process control (SPC) which attempts to define and control process variables so that all supplied product is sufficiently identical, eliminating the need for inspection.

Therefore, a need exists for a non-return valve which never fails to furnish the same shot size regardless of plastic, fillers, contamination, product produced, or wear. This valve should be designed to allow its incorporation into existing injection molding machines or any other device which utilizes a non-return valve. This valve should not be dependent on leakage through the valve to generate the force necessary to move the valve to its closed position. Furthermore, this valve should be designed so that the seal can never be impaired by particles. Thus, each time the valve seals, the sealing action should shear and clear away any such particles.

SUMMARY OF THE INVENTION

The present invention relates to a positive-type non-return valve. The valve is designed for use in an injection molding device with a screw type injection plunger but may be used in any application requiring one-way flow of a liquid material. In its simplest form, the valve is comprised of a frame surrounding a primary chamber. The primary chamber is comprised of a first bore and a second bore. The frame is generally cylindrical and typically has a tapered, conical downstream end. The proximal end can be threaded to allow for connection to a screw located in a barrel; however, the valve could also be an integral part of the screw. The outer diameter of the valve must closely approximate the inner diameter of this barrel. The first bore can extend to an axially-centered opening in the distal end of the valve. Because material is flowing through the valve, its proximal end is also referred to as upstream and its distal end is also referred to as downstream.

The second bore is accessed by at least one inlet port. This inlet port leads from the screw's material flow path to the first bore which is upstream of and connected to the first bore. Both of the first and second bores are cylindrical and typically concentric. The cross-sectional area of the second bore is usually less than that of the first bore. At least one outlet passage leads from this first bore to at least one port located on the downstream end of the valve. The upstream end of said outlet passage is located downstream from the downstream end of the inlet port.

A piston, or movable member, is dimensioned to fit inside the first bore and to extend into the second bore. The piston can have a main body dimensioned to slidably engage the first bore, and an upstream body which slidably engages the second bore. The upstream piston body may have a projected area less than, equal to, or greater than the projected area of the main piston body. In a preferred embodiment, the movable member has a projected downstream end area larger than the projected upstream end area. The movable member can slidably close and overstroke a material flow-path through the valve. The downstream travel of the piston is limited by a retainer such as a flow-through cap removably attached to the downstream end of the valve. The upstream travel of the piston is limited by a stop means, typically a ridge formed where the diameter of the first bore reduces at its intersection with the second bore. The reduced diameter portion of the piston is dimensioned to block the upstream opening to the outlet passage when said piston is in an upstream position, and to uncover said opening when in a downstream position.

Material, typically melted plastic, is fed into the inlets by the screw. This material floods the second bore and forces the piston towards its downstream position opening the outlet passages. The opening will be only partial to obtain equal forces on opposite ends of the piston. A pressure drop must occur across this partial opening so that the distal end area of the piston times its pressure is less than the proximal end area times its pressure. The material then proceeds into the outlet passages, out of the valve and into an accumulation area. When this area has collected a selected amount of plastic, the screw stops rotating and the piston moves to the closed position as the upstream pressure is reduced after the screw stops rotating. Typically the back pressure, used to assist the screw in melting plastic, is reduced to zero. Pullback is then frequently used to reduce pressure in the accumulated plastic to avoid leakage into the mold when the previously produced part is removed. After the previously produced part has cooled sufficiently, the mold is opened, the part is removed, and the mold is again closed. The screw ram then moves forward in the barrel producing pressure in the accumulation area to fill the mold. This pressure also tends to push material back into the outlet passage and back through the inlet, but as the valve has closed, leakage cannot occur.

Closing action is caused by pressure alone. No undesired leakage flow across the valve, as required in slider ring and ball check valves, is required to accomplish the closing action. The piston will encounter pressure against its upstream surface equal to the pressure against its downstream face. However, in the preferred embodiment, the force against its downstream face is greater and will overcome the force on its upstream face due to the differences in their respective surface areas. Thus, the piston will close quickly and repeatably prior to the injection step. The minimal partial opening of the valve described above assists in the quickness and repeatability of its action. The piston will also eliminate seat contamination as it will tend to shear away any contaminants in its way during closure.

Since valve closing results from only maintaining pressure in the accumulation area (after the screw stops rotating) while reducing pressure on the proximal end of the piston, the valve can be preclosed before injection. The valve is designed to have no material flow around and over the movable member valve.

A method of injection molding using this non-return valve involves precisely controlling both the volume and the pressure within the accumulation area. Knowing both values allows the operator to know the exact mass of the shot. The volume of the accumulation area is carefully measured and known. As material is conveyed into the accumulation area, the screw is displaced away from the accumulating area. The screw's rearward movement is limited to an exact position. The screw continues to rotate and attempts to convey more material into the accumulation area, causing the material pressure to increase. A pressure transducer is mounted in the wall of the accumulation area. When it measures a predetermined pressure, screw rotation is stopped. No more material is added to the shot. Pullback affects the pressure but the mass will remain constant for injection.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 1 is an isometric view of the positive-type, non-return valve;

FIG. 2 is a sectional view across line 2—2 in FIG. 1;

FIG. 3 is a longitudinal sectional view across line 3—3 in FIG. 2 without the piston and retainer;

FIG. 4 is a longitudinal sectional view across line 4—4 in FIG. 2 with the piston and retainer disassembled;

FIG. 5 is a longitudinal sectional view of a preferred embodiment of the nonreturn valve;

FIGS. 11 and 12 illustrate alternative embodiments of the non-return valve;

FIG. 13 illustrates a stream-lined version of the non-return valve;

FIG. 14 illustrates an inverted version of the non-return valve with a ring replacing the piston.

DETAILED DESCRIPTION OF THE DRAWINGS

Figure 6:
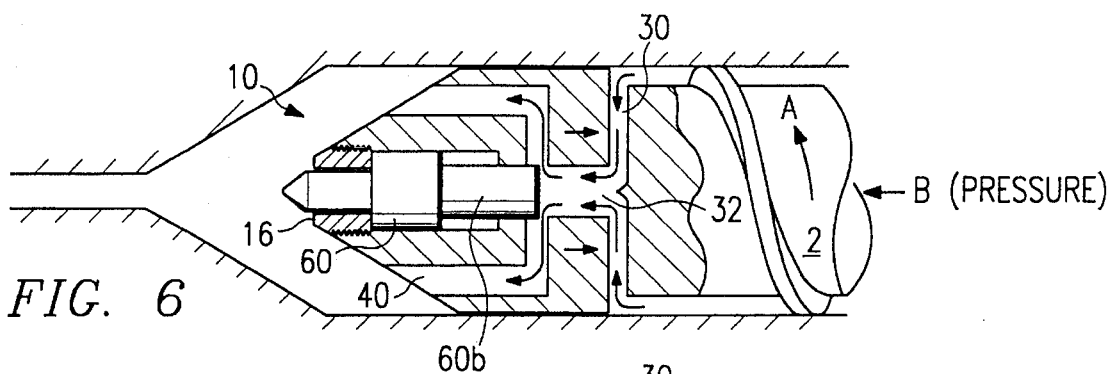
FIGS. 6 to 10 illustrate the various steps in a method of injection molding utilizing the present non-return valve.

The present invention relates to a non-return valve that overcomes many of the disadvantages found in the prior art. Referring to FIG. 1, a non-return valve 10 embodying the present invention is disclosed. Valve 10 is typically made of steel and used as part of an injection molding machine unit having a barrel, with an injection nozzle on one end of the barrel and a screw movable in the barrel. The valve 10 allows material to pass therethrough when the screw is rotating but closes prior to the screw translating forward without screw rotation. All dimensions provided below are for a valve 10 attached to a two and one-half (2½) inch feed screw. Other dimensions may be used to suit the situation.

Referring to FIGS. 1 to 5 simultaneously, valve 10 comprises a generally cylindrical frame 12 with an inclined or tapered surface 14 on the downstream end and an attachment surface 18 on the upstream end. A cap 16 or other retaining means with a flow through central passage 17 is attached to frame 12, typically by annular threads. A piston 60 is located in a first bore 34 and second bore 32 of frame 12. The non-return valve 10 is attached to or is a part of screw 2, as shown in FIG. 4, both of which are located in a barrel 8, shown in FIG. 3, with an accumulation area 6, shown in FIG. 3, located downstream of said valve 10. Both the screw 2 and valve 10 slidably fit within said barrel. Material is fed into inlet 30 by rotating the screw 2. As discussed, frame 12 contains a centrally located primary chamber comprising a first bore 34 and a second bore 32 which are accessed by several channels or passages. Inlets 30, located on ridge 20 lead to the second bore 32, best seen in FIG. 3, which is typically coaxial with the barrel, screw and valve 10. Inlets 30 can be oppositely located on ridge 20 and radially extend to the axis 4 of frame 12. The inlets are typically about one-quarter (¼) to three-eighths (⅜) inch in diameter. The second bore 32 extends from the inlets 30 to the first bore 34. The second bore 32 is preferably several inches long, as space permits, and approximately one half (½) inch in diameter.

FIG. 2 is a sectional view of valve 10 showing a typical relationship of inlet 30, outlet 40, first bore 34, and second bore 32. Although two inlets and two outlets are preferred, valve 10 would only require at least one of each. The first bore 34 can be coaxially located in the frame 12 immediately downstream of the second bore 32. The first bore 34 extends to the front opening 15 of the frame 12. The first bore 34 is defined by wall 36 and ridge 36a. The wall 36 immediately adjacent to the front opening 15 is typically threaded as at 38. The first bore 34 is preferably about two (2) inches long and three-quarters (¾) inches in diameter.

The downstream ends of outlets 40, best shown in FIG. 4, are located on the inclined surface 14 of frame 12. Outlets 40 can be positioned one hundred and eighty (180) degrees apart and are typically one-quarter (¼) inch in diameter. The upstream end of outlets 40 is initiated in the second bore 32. The outlet 40 may take any path from the second bore 32 to surface 14, but is preferably a smooth path without any sharp angles involved.

The piston 60 is dimensioned to fit closely but slidably inside first bore 34 and second bore 32. The piston 60 has a stepped outer surface creating at least two portions 60a, 60b. Piston portion 60a has a diameter slightly less than three-quarters (¾) of an inch and a length of approximately three-quarters (¾) of an inch. The piston portion 60b has a diameter of slightly less than one-half (½) inch and a length of approximately one and one-half (1½) inch. Thus, there is at most a clearance of a few thousandths of an inch between piston portion 60a and wall of first bore 34, and between piston portion 60b and second bore 32. The travel of piston 60 is limited by cap 16 at one end and by flange surface 36a at the other end. When in a forward position against cap 16, plastic may flow from inlet 30 into entrance 46 and through outlet 40. In a closed position, piston portion 60b blocks entrance 46 between inlet 30 and passage 44.

FIG. 5 illustrates a preferred embodiment of the non-return valve 10. This embodiment differs from those previously described in two respects. First, the outlets 40 are initially angled off of the second bore 32. The downstream exits of outlets 40 are located near the periphery of the downstream face of valve 10. Second, the piston 60 includes a third portion 60f extending downstream from the main piston body 60a. This third portion 60f extends through the flow-through portion of cap 16, forming a more flow dynamic downstream surface.

FIGS. 6 through 10 illustrate the various steps in a method of injection molding utilizing the present non-return valve 10. Two methods of injection are disclosed. The first method involves the steps of recovery, pullback, and injection. The second method involves the steps of recovery, preclosure, pullback after preclosure and injection. FIG. 6 illustrates the "recovery" step which occurs after a shot has been injected and the accumulation area is empty. The valve is open, allowing recovery of a new shot of material. The screw 2 and valve 10 are shown in a retracted position relative to the barrel 8. The screw 2 is rotating and plastic is flowing as indicated by the arrow A and feeding material through the inlets 30. Material next passes into the second bore 32 and encounters piston 60. The pressure exerted by the material due to the screw rotation pushes the piston to its downstream position within the valve 10. The material begins to fill accumulation area 6. As the accumulation area fills, the piston will experience increasing back pressure on its downstream end. At some point, a constant pressure differential will be established across the piston 60, and the piston 60 will move to an intermediate position within the valve 10. This intermediate position typically has the piston portion 60b partially covering the upstream end of outlet 40. For example, if the pressure on the distal end of the piston is set at 1000 psi and its area is two units and the proximal end of the piston has an area of one unit, then the pressure upstream must be 2000 psi and a 1000 psi pressure differential exists. The pressure loss occurs primarily across the upstream entrance to the outlet 40 which is only partially open. A back pressure is applied to the screw, as shown by arrow B, to prevent the screw from unscrewing through the material and to set the 1000 psi pressure in chamber 6. In other words, a back pressure is utilized to keep the screw in a fixed position at the end of the recovery step.

Figure 7:
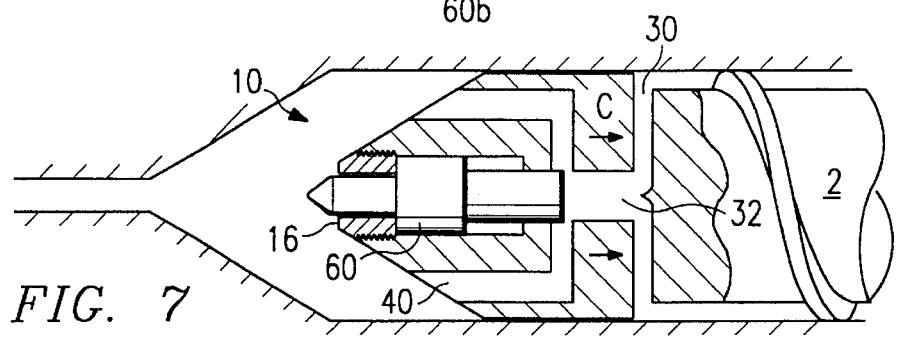

FIG. 7 illustrates "pullback" which may occur after "recovery". During pullback, the screw 2 stops its rotation, and the screw 2 and valve 10 are pulled back a small distance as indicated by arrow C. Pullback places a slight negative pressure on the downstream face of the piston and minimizes any leakage of material from the accumulation area into the mold when the mold is opened. The slight negative pressure will tend to pull the piston slightly downstream but motion is limited by cap 16.

Figure 9:
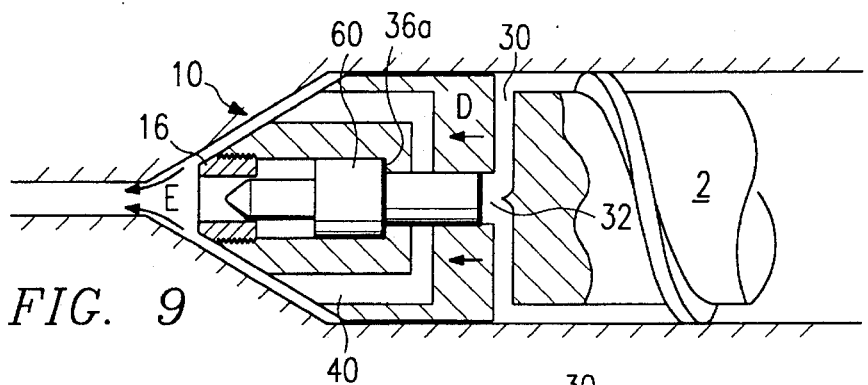

FIG. 9 illustrates the valve 10 during "injection". Once the shot of material is present in the accumulation area and the valve has pulled back, the screw and valve translate forward, as indicated by arrow D, to inject the shot into a mold. The piston will completely close automatically due to the high material pressure generated in the accumulation area. The piston is in an upstream position against flange surface 36a. In other words, the piston overstrokes the material flowpath. The shot is expelled as shown by the arrows E.

Figure 8:
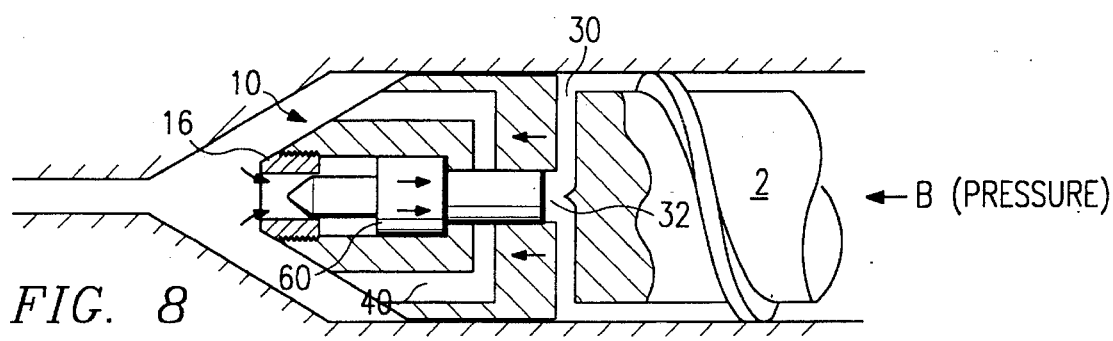

FIG. 8 illustrates the step of "preclosure" which can occur between recovery and pullback. The goal of preclosure is to close the piston 60 back over the upstream end of outlet 40 before the shot of material is injected. The piston precloses when pressure is maintained in the accumulation area without screw rotation to keep the valve open. This occurs when a back pressure is maintained on the screw as indicated by arrow B. Due to the area differential between the downstream face and upstream face of the piston 60, a force differential exists. Typically the ratio between the downstream face area to the upstream face area is between 2.0:1 and 1.5:1. This force differential precloses the piston prior to injection.

Figure 10:
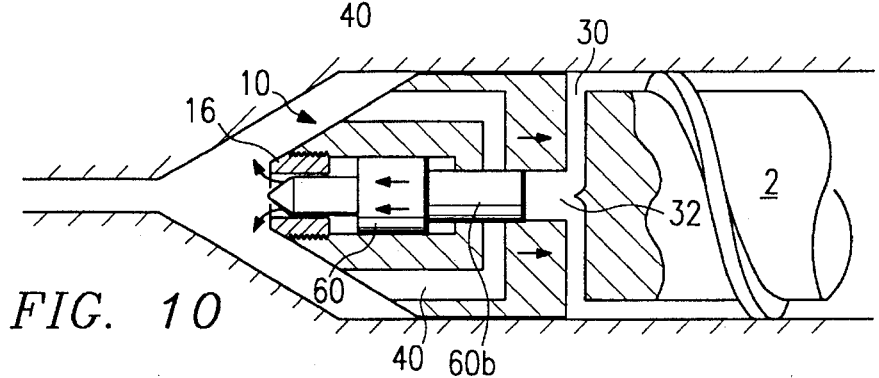

FIG. 10 illustrates the piston during the "pullback after preclose" stage of the injection method. After preclose, the screw 2 and valve 10 are pulled back in preparation for injection, in similar fashion to the step disclosed in FIG. 7. However, despite the negative pressure experienced by the downstream face of the piston, the valve remains closed due to the length of the reduced diameter piston portion 60b extending somewhat beyond the entrance to outlet 40 and the short duration of pullback. The step of injection is the same as discussed in FIG. 9.

FIGS. 11 and 12 illustrate alternate embodiments of the non-return valve designed to ensure that the valve remains closed during pullback after preclose. In FIG. 11, the last portion of the opening stroke of piston 60 is slowed by a smaller hole 16a in the cap or piston retainer 16. After the piston doses outlet passage(s) 16d during opening, material can be rejected into the piston cavity only through hole 16a, thus slowing its motion. Also, valve closings at both the start of injection and preclosure will be slowed. In FIG. 12, a small check valve 16b with a small hole 16a and retainer pin 16c is added downstream of the piston to avoid this slowing of closure. During opening motion of piston 60, the check valve 16b moves freely to a position against retainer pin 16c allowing easy material flow into the enlarging cavity for the piston 60. However, during closing motion of piston 60, the check valve 16b moves to its closed position and, as in FIG. 11, after passages 16d have been closed, material can be rejected from the piston cavity only through the small passage 16a, thus slowing the speed of piston 60.

FIG. 13 illustrates a non-return valve 10 which is integral with the screw 2.

FIG. 14 illustrates a version of the valve with a ring functioning as the piston. In this version, the ring 61 has an area on its distal end larger than that on its proximal end. It is functionally identical to piston 60 even though it closes inlets 30 instead of outlets 40. Retainer pin 62 performs the same function as cap 16 performs on the piston design. The valve body is shown as an integral part of screw 2, but it can alternatively be threaded into the screw as shown in FIG. 1.

In sum, a preferred embodiment of the valve 10 fits into the same area as a prior art non-return valve. The material proceeds downstream between the screw flights due to the rotation of the screw until it encounters the valve 10. As it reaches the valve 10, the material enters the two inlet holes 30 on either side of the valve 10, and proceeds to the second bore 32. The material forces the piston 60 into a downstream position, exposing a portion of the upstream entrance to outlet 40. The material follows the outlet passage 40 until it discharges from the valve 10 and into accumulation area 6 which communicates with the downstream end of piston 60. After the accumulation area 6 is filled to the selected volume, the screw 2 stops its rotation. After the previously molded part is removed from the mold, the forward stroke begins and the piston 60 is moved to an upstream position blocking the material flowpath between inlet 30 and outlet 40. The piston 60 can be preclosed prior to injection if accumulated pressure multiplied by the ratio between the downstream face and the upstream face is greater than the upstream pressure. This can be easily accomplished if back pressure is maintained on the screw for a moment. The force that is seen in the upstream direction is greater than in the downstream direction although the pressures are the same. Therefore, the piston 60 will move upstream closing off the entrance 46. As the piston moves upstream and covers the entrance to outlets 40 there is a positive shut off through the sliding and covering of this radial hole.

Figure 15:
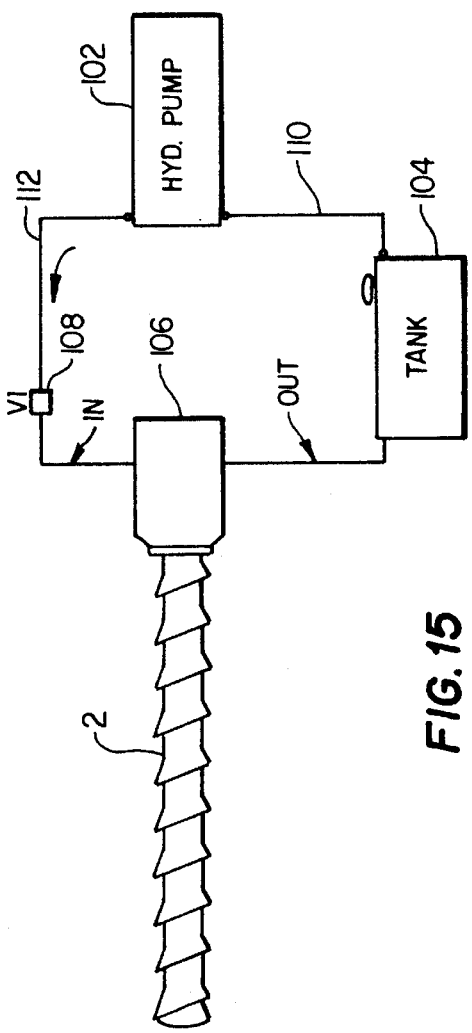
FIGS. 15 and 16 schematically show the method of controlling both volume and pressure of the material in the accumulation area.
Figure 16:
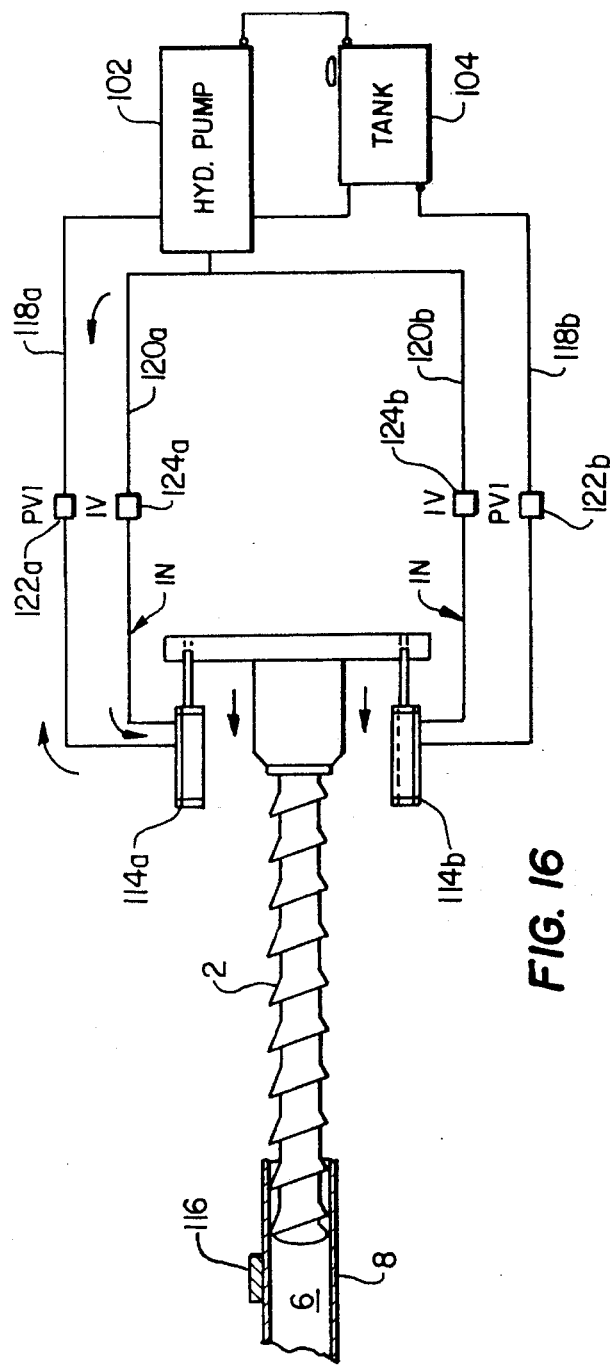

FIG. 15 illustrates the hydraulic system which controls the rotation of screw 2. FIG. 16 illustrates the hydraulic system which controls the translation of the screw within the barrel. Referring to FIGS. 15 and 16 simultaneously, the method of precisely controlling the mass of injected material within the accumulation requires the precise control of both the volume of the accumulation area and the pressure experienced therein. It is well known that the mass (M) of an object is equal to its volume (V) multiplied by its density (D). For plasticized material, the density is proportional to the pressure the material is experiencing. Therefore, one could control the mass of a shot of material by precisely controlling its volume and its pressure. Once established, either the pressure or volume can be varied as long as no additional material is conveyed into the accumulation area.

Referring to FIG. 15, a hydraulic pump 102 is used to rotate the screw within the barrel. The pump 102 is coupled to a tank or reservoir 104 of hydraulic fluid by output line 110. The pump 102 is connected to the screw 2 by a transmission 106. Hydraulic pressure is transmitted to the transmission through an input line 112. An inlet valve 108 controls the flow of hydraulic fluid through input line 112 from the pump to the transmission 106. FIG. 16 illustrates the hydraulic system used to translate the screw within the barrel 8. The hydraulic pump 102 is also attached to a pair of hydraulic injection cylinders 114a, 114b by input lines 120a, 120b. Both cylinders are attached to the screw. When the cylinders are pressurized, the screw translates. Cylinder pressure is released to the tank 104 through output lines 118a, 118b. Input valves 124a, 124b controls the flow of hydraulic fluid through the input lines. Pressure valves 122a, 122b controls the flow of hydraulic fluid through the output lines. A pressure transducer 116 is attached to the wall of the accumulation area 6.

As discussed, one method of injection molding with the above-described non-return valve includes the steps of (1) recovery, (2) pullback, and (3) injection. At the start of recovery, the screw 2 rotates to convey material through the non-return valve and into the accumulation area. The inlet valve 108 is opened to allow oil flow from the pump 102 to start rotation. The oil returns to the tank 104. The plastic fills the accumulation area and forces the screw rearward. The backpressure is maintained at a desired pressure by the pressure valves 122a, 122b located on the discharge (return) side of the hydraulic injection cylinder.

When the desired stroke length is attained, the pressure valves 122a, 122b are closed, keeping oil in the hydraulic injection cylinders 114a, 114b. This establishes the stroke length by eliminating further rearward movement of the screw. The desired stroke length can be sensed by a signal from any appropriate means such as a limit switch along the barrel. More than one valve may be closed to hydraulically lock the screw in the predetermined rearward or first position.

The pressure transducer 116 is attached to the wall of the accumulation area 6 and can sense the pressure of the accumulated material. After the rearward travel of the screw stops, the screw continues to rotate. The continued rotation increases the pressure within the accumulation area. When the increasing pressure reaches a predetermined value, the transducer 116 senses the desired pressure it will send a signal to stop the hydraulic pump 102, thus stopping the screw rotation. When the accumulation area pressure reaches the predetermined pressure, the non-return valve will close due to the immediate decline in upstream screw pressure.

Pullback can be accomplished at this time by opening the pressure valves 122a, 122b for a controlled time. Care must be taken not to reopen the non-return valve or reclosure will occur during injection, changing the accumulated shot mass. After pullback, the pressure valves 122a, 122b are reclosed.

Injection is then initiated by opening the inlet valves 124a, 124b and pressuring the pump 102 to the desired level. During the injection stroke, the valve and screw assembly translate forward in the barrel from a rearward or first position to a forward or second position. The volume of material displaced between the first and second positions is easily determined and these positions are predetermined. A "cushion" of material can be left in the accumulation area after the injection stroke. After injection is completed, recovery begins again as the inlet valve is closed and the pressure valve is again in the backpressure control mode. This method of injection molding establishes a precise shot mass by controlling both the pressure and volume of material in the accumulation area. Even if the screw is pulled back to avoid any dribble, thus decreasing the pressure in the accumulation area, the mass of the material in the accumulation area is already established.

Although preferred embodiments of the invention have been described in the foregoing Detailed Description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications, and substitutions of parts and elements as fall within the spirit of the scope of the invention.

I claim:

1. A method of injection molding using a screw in a barrel comprising:

(a) conveying a predetermined volume of material into an accumulation area downstream of a non-return valve within a barrel by rotating said screw causing the screw to translate rearward;

(b) stopping the rearward travel to of the screw at a first position;

(c) increasing the pressure of said material within the accumulation area by continuing to rotate said screw after the rearward travel has stopped until a predetermined pressure is achieved in said accumulation area; and (d) substantially purging said accumulation area.

2. The method of injection molding of claim 1 wherein the step of conveying a predetermined volume of material to the accumulation area comprises:

(i) rotating said screw to convey material to the accumulation area;

(ii) accumulating material in the accumulation area, thereby rearwardly translating the screw from the accumulation area in response to the accumulation.

3. The method of injection molding of claim 1 wherein said step of purging further comprises stroking the screw forward to a second position.

4. The method of injection molding of claim 2 wherein the step of stopping the rearward translation of said screw comprises triggering a signal.

5. The method of injection molding of claim 2 wherein the step of stopping the rearward translation of the screw comprises closing one or more valves thus locking the screw in the first position.

6. A method of injection molding comprising:

(a) conveying a predetermined volume of material into an accumulation area downstream of a non-return valve within a barrel wherein said step of conveying involves:

(i) rotating said screw to convey material to the accumulation area;

(ii) allowing the screw to rearwardly translate from the accumulation area in response to the accumulation of material in the accumulation area; and (iii) stopping the rearward translation of the screw at a first position; and (b) controlling the pressure of said material within the accumulation area, wherein the step of controlling the pressure within the accumulation area comprises:

(i) rotating the screw to increase the pressure of the material in the accumulation area;

(ii) sensing the pressure in the accumulation area with a pressure transducer coupled to the accumulation area; and (iii) stopping screw rotation when the sensed pressure reaches a predetermined level.

7. The method of injection molding of claim 6 further comprises:

(c) stroking the screw forward to a second position.

8. The method of injection molding of claim 6 wherein the step of stopping the rearward translation of the screw comprises triggering a signal.

9. The method of injection molding of claim 8 wherein the step of stopping the rearward translation of the screw comprises closing one or more valves hydraulically locking the screw in the first position.

* * * * *